United States Patent

[11] 3,612,701

[72] Inventor Irving Bleicher
       Fairlawn, N.J.
[21] Appl. No. 790,004
[22] Filed Jan. 9, 1969
[45] Patented Oct. 12, 1971
[73] Assignee Singer-General Precision Inc.
       Little Falls, N.J.

[54] LIGHT-DETECTING SYSTEM
2 Claims, 4 Drawing Figs.

[52] U.S. Cl. ........................................... 356/172,
       250/203
[51] Int. Cl. .................................... G01b 11/26,
       G01j 1/20
[50] Field of Search ............................ 356/172;
       350/289; 250/203

[56] References Cited
       UNITED STATES PATENTS
3,388,629  6/1968  Brenholdt et al. ............ 356/147

| 3,088,033 | 4/1963 | Kaufold........................ | 250/203 |
| 3,244,885 | 4/1966 | McHenry..................... | 250/203 |
| 3,244,887 | 4/1966 | Lozins......................... | 250/203 |
| 3,263,084 | 7/1966 | Boydell........................ | 250/203 |
| 3,305,686 | 2/1967 | Carver et al. ................ | 250/203 |
| 3,322,953 | 5/1967 | Zuckerbraun................ | 250/203 |
| 3,430,049 | 2/1969 | Hughes........................ | 250/203 |
| 3,330,958 | 7/1967 | Kaisler et al. ................ | 250/203 |
| 3,480,779 | 11/1969 | Hand............................ | 250/203 |

Primary Examiner—Ronald L. Wibert
Assistant Examiner—T. Major
Attorneys—S. A. Giarratana, G. B. Oujevolk and S. M. Bender ABSTRACT: A light-detecting system in which reflecting means are disposed in the path of the light to be detected in order to reflect the light onto a fixed sensing means responsive to the reflected light, for generating a corresponding output signal. Means are provided to impart motion to the reflecting means to move the reflected light in a fixed path across the sensing means.

INVENTOR
IRVING BLEICHER

BY

*S. A. Giarratana*

ATTORNEYS

INVENTOR
IRVING BLEICHER

BY

ATTORNEYS

LIGHT-DETECTING SYSTEM

BACKGROUND OF THE INVENTION

This invention relates to a light-detecting system and, more particularly, to a system for detecting the spatial position of a source of collimated light.

To provide detection systems for a source of collimated light, such as a star in space, has generally been recognized. Some of these known systems utilize means to reflect the collimated light onto a series of mosaic-type detectors which generate output signals proportional to the position of the light. However, these mosaic detectors are very large in size, and require much sophisticated associated circuitry.

It has also been proposed to utilize a relatively small sensing panel which is moved in a rectilinear scanning motion at right angles to the light image. However, this system requires very complex and costly mechanism to move the sensing panel, and has a low natural frequency rendering the system susceptible to vibrations. Also, the detector motion increases the noise level of the output signal, and the associated components require extremely critical alignment.

It is therefore an object of the present invention to provide a system for detecting the position of a source of light, which produces a very low noise output signal, which is of a simple mechanical design, and which is highly reliable and low in cost.

Briefly summarized, the light-detecting system of the present invention comprises reflecting means disposed in the path of the light to be detected and adapted to reflect the light, means to impart motion to said reflecting means to move the reflected light in a fixed path, and fixed sensing means disposed in the fixed path and responsive to the reflected light to generate a corresponding output signal.

BRIEF DESCRIPTION OF THE DRAWINGS

Reference is now made to the accompanying drawings for a better understanding of the nature and objects of the light-detecting system of the present invention, which drawings illustrate the best mode presently contemplated for carrying out the objects of the invention and its principles, and are not to be construed as restrictions or limitations on its scope. In the drawings.

DESCRIPTION OF THE PREFERRED EMBODIMENTS

Figure 1:
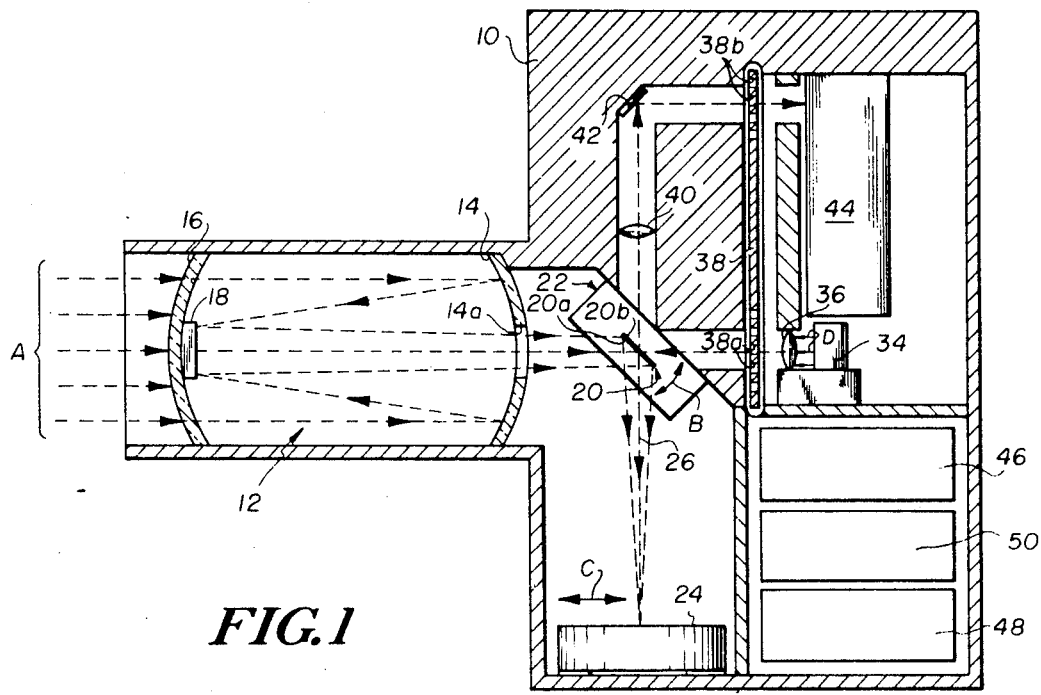
FIG. 1 is a vertical cross-sectional view, partly diagrammatic, showing the system of the present invention.

Referring specifically to the drawings, FIG. 1 depicts the system of the present invention mounted in a housing 10 and adapted to detect the position of a source of collimated light, such as a star or the like, passing into the system in the direction indicated by the arrows A. The reference numeral 12 refers, in general to a Cassegrainian telescope, which includes a primary lens 14 having a mirrored inner surface and a hole 14a extending through the center thereof, and a transparent member 16 having a secondary lens 18 mounted thereto, the path of the light thus passing in the direction shown by the arrows between the primary lens and the transparent member 16, with only the central and outer rays of the light being shown, in the interest of simplicity. As a result, light from the secondary lens 18 passes through the hole 14a of the primary lens, and onto the front surface 20a of a mirror 20 mounted with respect to a torque motor housing 22. As will be described in detail later, the torque motor imparts a rocking motion to the mirror 20 in a direction indicated by the arrows B to reflect the light in the form of a beam onto a V-slit detector 24. This reflected beam is shown at 26, and as a result of the above rocking motion of the mirror 20, it oscillates in the direction indicated by the arrows C.

Figure 2:
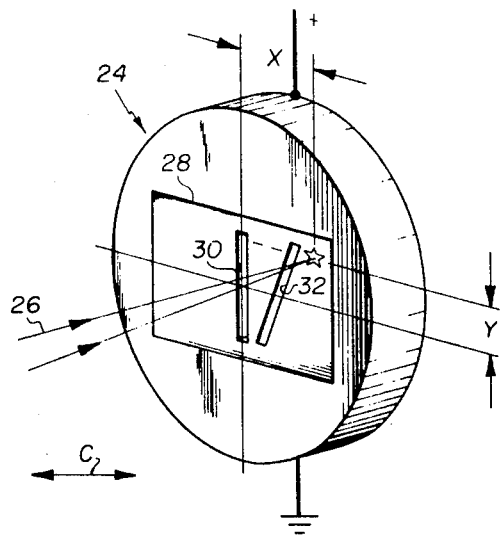
FIG. 2 is a perspective view showing the optical detector utilized of the present invention.

The V-slit detector 24 is shown in detail in FIG. 2 of the drawings and may be similar to the detector disclosed in U.S. Pat. No. 3,388,629. Specifically, the detector may include a cadmium selenide sensing means having a mask 28 with two slits 30 and 32 disposed at a predetermined known angle. The arrangement is such that when the oscillating beam of light 26 passes over the detector 24 at right angles to one of the slits, a signal will be produced each time the beam strikes one of the slits. Therefore it is apparent that information relating to the position of the light source in the X-plane, is directly proportional to the striking of one of the slits by the beam of light, while the Y-plane information can be determined upon the beam striking the other slit since the distance between slits and their relative angular position is known. The associated electronics for providing this information will be described in detail later.

Means are provided to monitor the exact position of the mirror 20 with respect to the housing 10. Referring again to FIG. 1, an angular encoder system is shown which includes a light source 34 adapted to emit light in the direction indicated by the arrows D through a focusing lens 36 and a lower set of slits 38a of a reticle 38. The light from these slits bounces off of the back surface 20b of the mirror 42 and, from there, passes through a focusing lens 40 onto a mirror 42 angularly fixed with respect to the housing 10. The reflected light from this mirror 42 passes through an upper set of slits 38b of the reticle 38 and onto an optical detector 44. This detector may be of a well-known type such as an array of silicon photovoltaic detectors which are adapted to generate an output signal corresponding to the light input.

The upper set of slits 38b may be arranged relative to the lower set of slits 38a so that, upon rocking motion of the mirror 20a, a pulsating light input passes into the optical detector 44. Also, a reference slit system may be provided in the reticle 38 so that a zero reference can be obtained for the pulsating light input, in a known manner.

Figure 3:
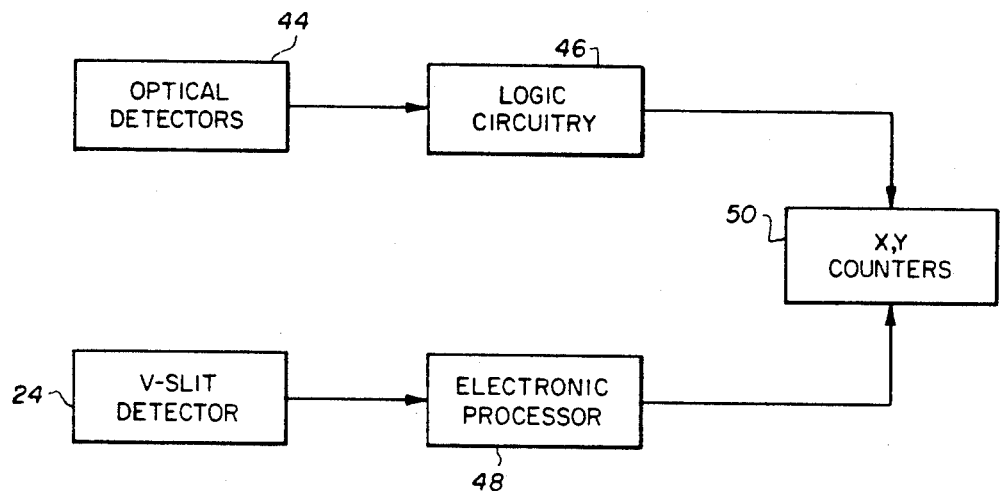
FIG. 3 is a block diagrammatic view showing the relative arrangement of the electronics utilized in the present invention.

A logic circuitry 46, an electronic processer 48, and a pair of counters shown at 50 are also disposed in the housing 10 and are better described with reference to FIG. 3.

Specifically, an output signal is generated by the optical detector 44, and is in the form of a pulsating electronic signal corresponding to the pulsating light input from the upper set of reticle slits 38b, and therefore corresponding to the position of the mirror 20. This output signal is fed to the logic circuitry 46 which shapes the signal so that the pulses are generated at the zero crossings, and determines whether these pulses are "up" or "down" depending on the direction of movement of the mirror. Similarly, the output from the V-slit detector 24 is in the form of an electronic signal corresponding to the optical position of the light source in the X- and Y-planes, and is processed by the electronic processor 48 which takes the pulses from the V-slit detector and amplifies them. This processor also may include a Schmitt trigger circuit, or the like, which generates an output pulse when the amplified signal exceeds a predetermined level.

The outputs from the logic circuitry 46 and the electronic processor 48 are fed into the counters 50 which count the input pulses and reference pulses from the logic circuitry as compared to the output signals from the processor and, in turn, generate output counts which are directly proportional to the position of the light source in the X- and Y-planes.

It is understood, of course, that in the event the detector of the present invention is utilized as a star tracker in a space vehicle, this output signal can, in turn, be applied to a computer, or the like, for computing the exact relative position of the vehicle with reference to the star and provide any necessary navigational corrections.

Figure 4:
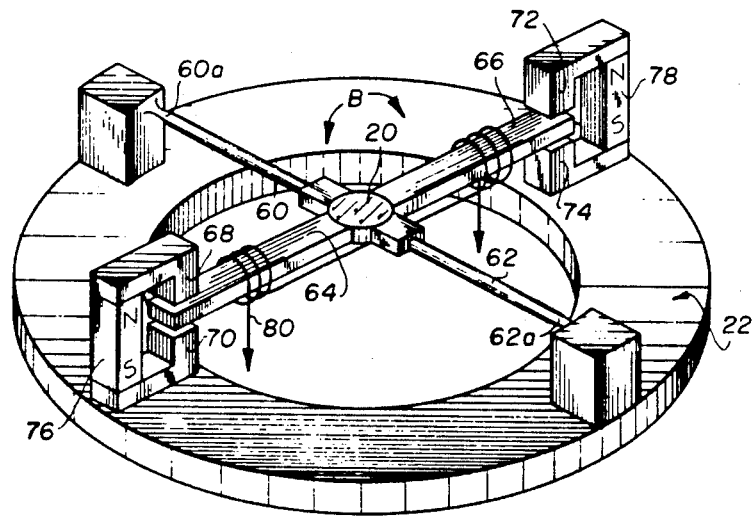
FIG. 4 is a perspective view depicting the torque motor utilized in the present invention.

The device to impart the rocking motion to the mirror 20 may be in the form of a torque motor shown mounted in the housing 22 in FIG. 4, with only a portion of the latter being shown for convenience of presentation. Specifically, a pair of torsion bars 60 and 62 are fixed with respect to the sides of the mirror 20 and are mounted, via a pair of flex pivots 60a and 62a, to the torque motor housing 22 to provide limited rocking movement of the mirror in the directions indicated by the arrows B. An additional pair of arms 64 and 66 extend from the ends of the mirror 20, with arm 64 being mounted between a pair of pole pieces 68 and 70, and arm 66 being mounted between a pair of pole pieces 72 and 74, the former pole pieces extending to each side of a magnet 76 and the latter pole pieces extending to each side of a magnet 78. A coil 80 is wrapped around the arms 64 and 66, so that the normally balanced field created by the respective pole pieces is upset in response to an input current being applied to the coil 80, therefore causing a rocking motion of the mirror 20 about the flex pivots 60a and 62a in the direction indicated by the arrows B.

In operation of the system of the present invention, the light source to be detected is passed into the telescope 12 in the direction indicated by the arrows A whereby it is reflected, as indicated, onto the surface 20a of the mirror 20. A drive signal is applied to the coil 80 of the torque motor which imparts a rocking movement to the mirror 20 in a direction indicated by the arrows B, causing the oscillating reflected beam of light 26 to pass across the V-slit detector 24. At the same time, the light from the source 34 and the lower set of slits 38a is reflected off the surface 20b of the mirror, and the reflected light passes through the lens 40 to the mirror 42. The light is thus reflected through the upper set of slits 38b which, due to the rocking motion of the mirror 20, produces an output signal in the form of pulsating light, which passes into the optical detector 44.

The outputs from the V-slit detector 24 and the optical detector 44 are fed into the electronic processor 48 and the logic circuitry 46, respectively, as described above, and the outputs from the latter are each fed into the counter 50 which provides an indication of the light source with respect to the X- and Y-planes.

It is therefore seen that the detection of the present invention produces low noise output signals, is of a simple mechanical design, and is highly reliable and low in cost.

Of course, variations of the specific construction and arrangement of the detecting system disclosed above can be made by those skilled in the art without departing from the invention as defined in the appended claims.

I claim:

1. A system for detecting the position of a source of light for use as a star tracker comprising:
   a support structure,
   optical telescope means fixedly mounted on said support structure and arranged to receive and to focus the image of the source of light,
   reflecting means resiliently mounted for oscillation on said support structure, said reflecting means having a surface arranged to receive the image of the source of light focused thereon by said optical telescope means and to reflect said image therefrom,
   a V-slit detector fixedly mounted on said support structure, said V-slit detector having a face arranged to receive the reflected image of the source of light, said V-slit detector including at least two photoconductive slit-sensing means disposed at a predetermined angle and being arranged to separately and sequentially receive said reflected image, each said slit-sensing means being normally nonconductive and being separately operative to turn conductive and to pass a peak output when being engaged by said reflecting image,
   a shaft fixedly connected to said reflecting means and resiliently mounted on said support structure for oscillating said reflecting means through a predetermined angle of rotation, said shaft being an elongated torsion bar having a center portion on which said reflecting means is fixedly mounted, said bar having opposite end portions respectively having torsional flexure members fixedly connected to said support structure,
   motor means connected to said shaft for oscillating said shaft at a predetermined rate of oscillation, said motor means including an arm fixedly connected to said torsion bar and means including a pair of magnetic pole pieces disposed adjacent at least one end of said arm and being mounted on said support structure, said arm having means disposed adjacent said pole pieces for applying an oscillating electromagnetic field to produce oscillation of said torsion bar,
   monitoring means to monitor the instantaneous position of said reflecting means relative to said support structure including a light source mounted on said support structure, a second optical detector and a lens system, said lens system being arranged to transmit a beam of light from said mounted light source to said reflecting means thence to said second detector, and,
   logic circuitry means connected to said monitoring means and to said V-slit detector for locating the position of said image as received by said optical telescope means.

2. A system as in claim 1 wherein said reflecting means includes a mirror fixedly connected to said shaft and the arm of said motor means extends substantially orthogonally with respect to said torsion bar and comprises pole pieces and electromagnetic field means associated with each end of said arm.